United States Patent
Koegel

(10) Patent No.: US 10,328,507 B2
(45) Date of Patent: Jun. 25, 2019

(54) AIRFLOW AND ILLUMINATION SYSTEM FOR A TABLE SAW

(71) Applicant: Robert Bosch GmbH, Stuttgart (DE)

(72) Inventor: Jan Koegel, Freudenstadt (DE)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 133 days.

(21) Appl. No.: 15/108,446

(22) PCT Filed: Dec. 17, 2014

(86) PCT No.: PCT/US2014/070866
§ 371 (c)(1),
(2) Date: Jun. 27, 2016

(87) PCT Pub. No.: WO2015/102909
PCT Pub. Date: Jul. 9, 2015

(65) Prior Publication Data
US 2016/0332244 A1    Nov. 17, 2016

Related U.S. Application Data

(60) Provisional application No. 61/921,770, filed on Dec. 30, 2013.

(51) Int. Cl.
*B27B 5/29* (2006.01)
*B27G 19/02* (2006.01)
(Continued)

(52) U.S. Cl.
CPC ........ *B23D 59/006* (2013.01); *B23Q 11/0046* (2013.01); *B23Q 17/2404* (2013.01);
(Continued)

(58) Field of Classification Search
CPC .... B23D 59/006; B23D 47/025; B27G 19/02; Y10T 83/207; Y10T 83/773;
(Continued)

(56) References Cited

U.S. PATENT DOCUMENTS 4,875,398 A * 10/1989 Taylor .................. B23D 59/006
144/252.1
5,084,972 A    2/1992 Waugh
(Continued)

FOREIGN PATENT DOCUMENTS

DE    4205965 C1 *  7/1993
FR    2543873 A1 * 10/1984
(Continued)

OTHER PUBLICATIONS

International Search Report corresponding to PCT Application No. PCT/US2014/070866, dated Apr. 6, 2015 (3 pages).
(Continued)

*Primary Examiner* — Stephen Choi
(74) *Attorney, Agent, or Firm* — Maginot Moore & Beck LLP

(57) ABSTRACT

An airflow management system for a table saw includes an elongated hollow member and a dust cap. The elongated hollow member includes a first prong and a second prong, the first and second prongs being configured to be positioned adjacent a saw blade on opposite sides of a saw blade plane in which the saw blade is positioned. The first and second prongs define an opening and a partially enclosed space, in which an airflow channel is defined, therebetween. The dust cap is attached to the elongated hollow member and includes a hose connection fluidly connected to the airflow channel of the elongated hollow member and configured to connect to a vacuum source to pull air from the airflow channel through the hose connection.

17 Claims, 11 Drawing Sheets

(51) Int. Cl.
  *B23D 59/00* (2006.01)
  *B23Q 11/00* (2006.01)
  *B27B 5/24* (2006.01)
  *B23Q 17/24* (2006.01)

(52) U.S. Cl.
  CPC .......... *B23Q 17/2419* (2013.01); *B27B 5/243* (2013.01); *B27G 19/02* (2013.01); *Y10T 83/207* (2015.04)

(58) Field of Classification Search
  CPC ............ Y10T 83/7734; B23Q 11/0046; B23Q 17/2404; B23Q 17/2419; B27B 5/243; Y02P 70/171
  See application file for complete search history.

(56) References Cited

U.S. PATENT DOCUMENTS

| | | | |
|---|---|---|---|
| 7,806,032 | B2 | 10/2010 | Weir et al. |
| 2007/0163408 | A1 | 7/2007 | Buck et al. |
| 2008/0022827 | A1 | 1/2008 | Weir et al. |
| 2009/0183377 | A1* | 7/2009 | Loveless .............. B23D 59/006 30/390 |
| 2010/0307307 | A1 | 12/2010 | Butler |
| 2011/0162501 | A1 | 7/2011 | Koegel et al. |
| 2011/0179923 | A1 | 7/2011 | Tsuda et al. |
| 2012/0036972 | A1 | 2/2012 | Frolov |
| 2012/0090440 | A1* | 4/2012 | Koegel ................ B23D 59/006 83/100 |
| 2012/0255415 | A1 | 10/2012 | Koegel |
| 2015/0128998 | A1* | 5/2015 | Nemedi .................... B08B 5/04 134/21 |
| 2016/0016241 | A1* | 1/2016 | Taylor .................. B23D 45/062 83/100 |

FOREIGN PATENT DOCUMENTS

| | | |
|---|---|---|
| TW | 201210773 A | 3/2012 |
| TW | I383873 B | 2/2013 |
| TW | I396614 B | 5/2013 |

OTHER PUBLICATIONS

English Translation of Taiwan Examination Report corresponding to Taiwan Patent Application No. 103145669 (4 pages).
Supplementary European Search Report corresponding to European Patent Application No. 14 87 6944 (11 pages).

* cited by examiner

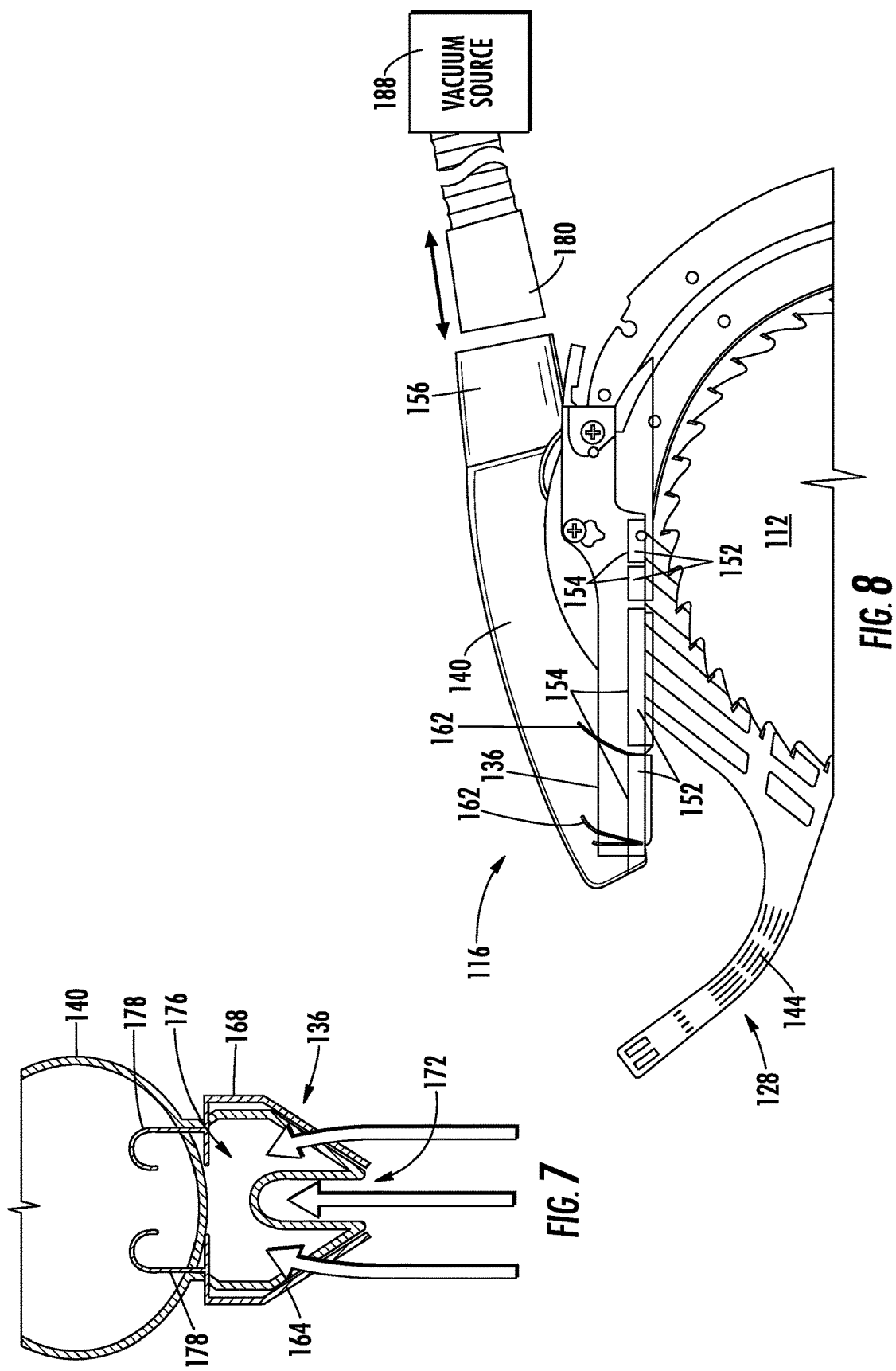

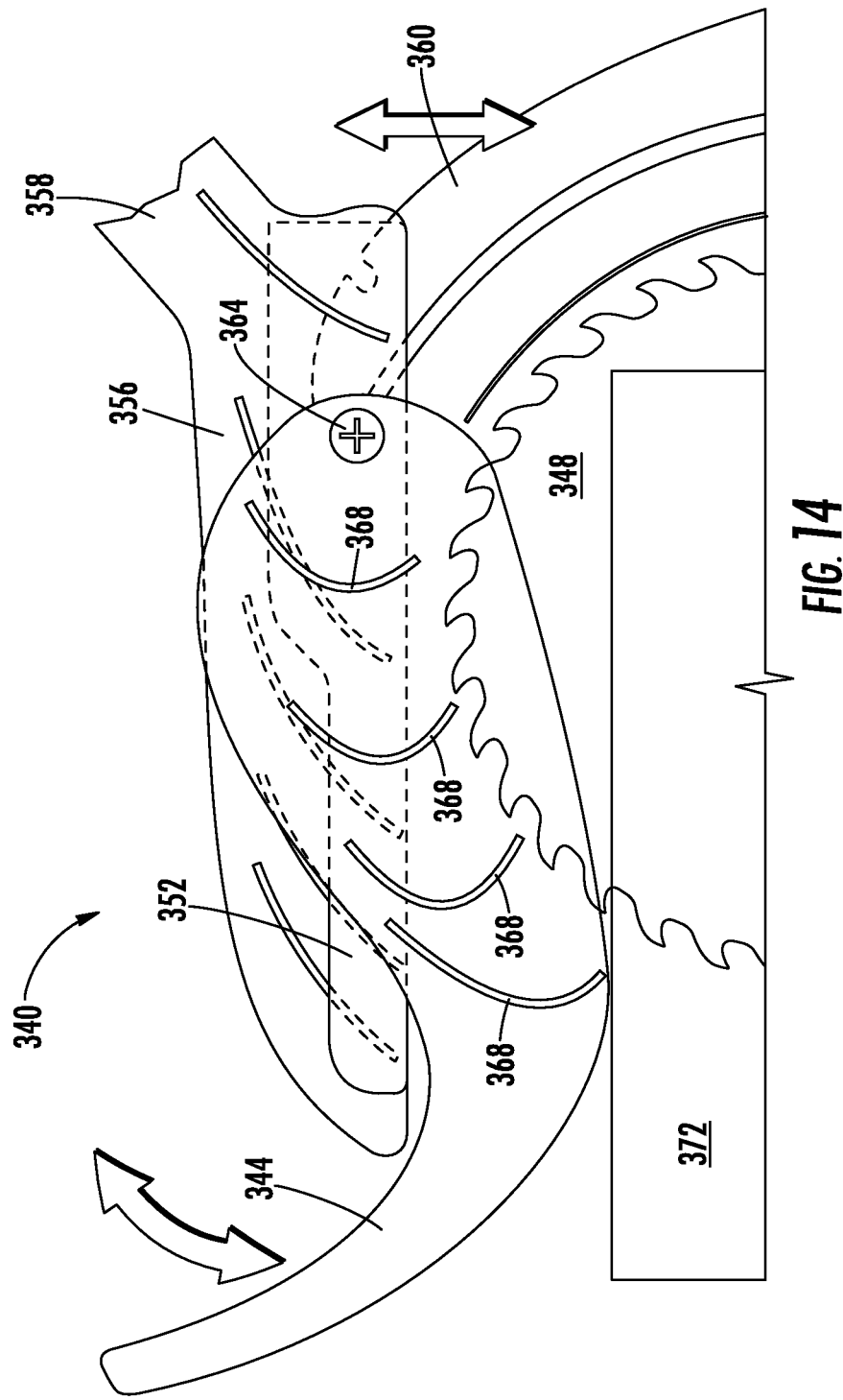

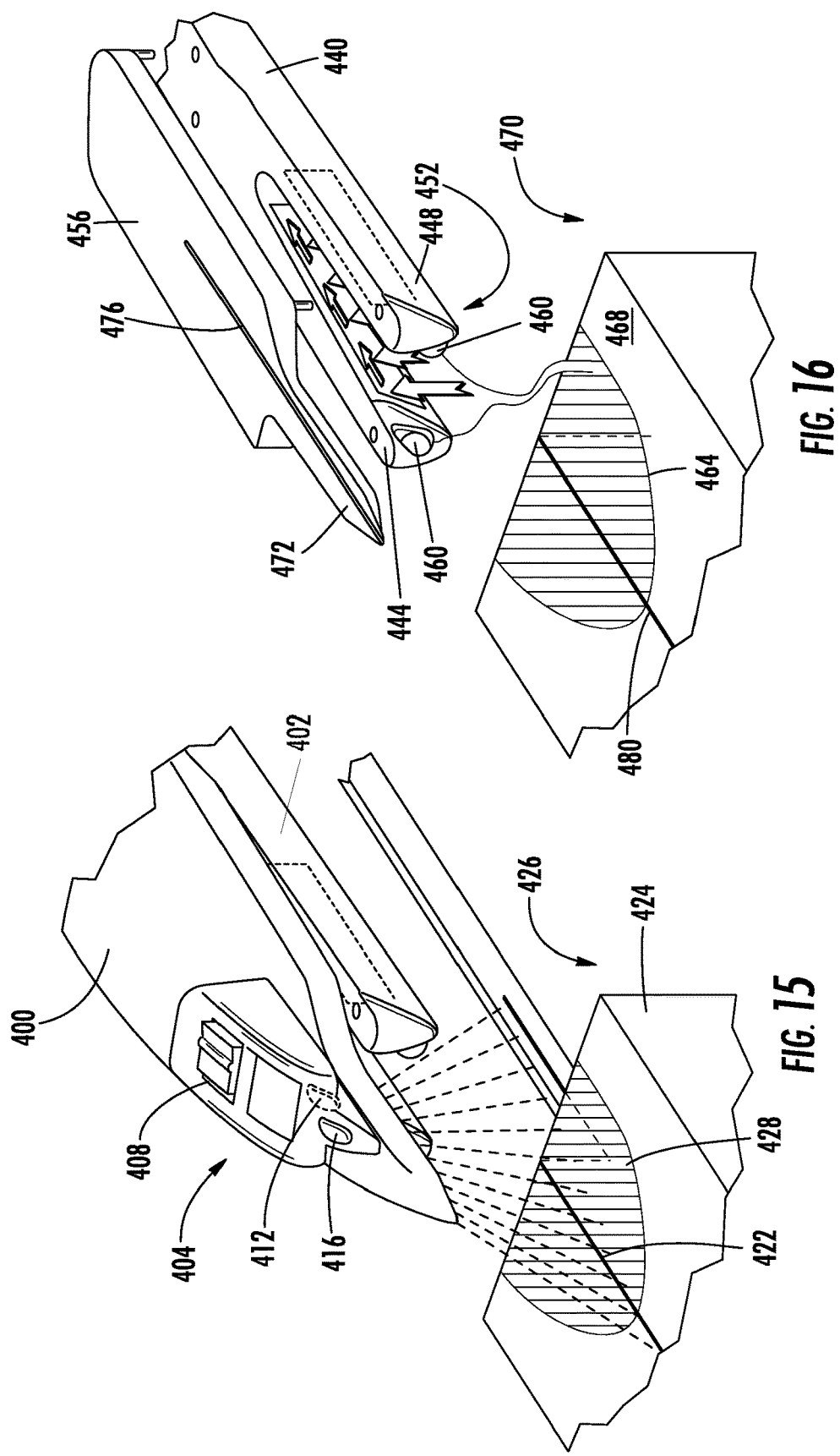

AIRFLOW AND ILLUMINATION SYSTEM FOR A TABLE SAW

CLAIM OF PRIORITY

This application is a 35 U.S.C. § 371 National Stage Application of PCT/US2014/070866, filed on Dec. 17, 2014, which claims the benefit of priority to U.S. provisional application No. 61/921,770, which is entitled "Airflow and Illumination System for a Table Saw" which was filed on Dec. 30, 2013, the disclosures of which are incorporated herein by reference in their entirety.

TECHNICAL FIELD

This disclosure relates generally to power tools, and, more particularly, to airflow management for power tools.

BACKGROUND

Power saws, for example table saws, circular saws, and miter saws, are a type of power tool used for cutting and shaping workpieces such as, hardwood, manufactured wood products, construction lumber, and other materials. The typical power saw includes a circular blade, which rotates to cut through a workpiece during a cutting operation. During the cutting operation, the power saw generates dust and debris as the rotating blade cuts through the workpiece. The dust and debris can interfere with the cutting operation by obstructing the user's view of the workpiece and diffusing into the surrounding air space. Additionally, the dust and debris contaminates the area near the cutting task, necessitating extensive clean up and potentially causing issues with other equipment nearby. Furthermore, the user of the power saw is exposed to the dust and debris, which, in some instances, can cause respiratory issues when inhaled. Accordingly, it is desirable to collect the dust generated by the power saw with a dust collection system.

Dust collection systems vary depending on the type of power saw. Table saws, for example, typically include a source of vacuum that is fluidly connected to the table saw with a vacuum line. In particular, table circular saws include an upper guard and a lower guard, both of which are typically connected to the source of vacuum by a vacuum line. Typical table saws only include a vacuum hose connected to the upper guard. The upper guard and vacuum is unable to catch a substantial portion of the dust and debris ejected upwardly by the power saw, enabling the dust and debris to diffuse into the area surrounding the table saw. Furthermore, the guard can block sight of the workpiece during cutting, and make it difficult to make an accurate cut.

It would thus be desirable to provide a dust collection and illumination system to not only improve collection of the dust and debris generated during a cutting operation, but also facilitate better visibility in the cutting area.

SUMMARY

An airflow management system for a table saw includes an elongated hollow member and a dust cap. The elongated hollow member includes a first prong and a second prong, the first and second prongs being configured to be positioned adjacent a saw blade on opposite sides of a saw blade plane in which the saw blade is positioned. The first and second prongs define an opening and a partially enclosed space, in which an airflow channel is defined, therebetween. The dust cap is attached to the elongated hollow member and includes a hose connection fluidly connected to the airflow channel of the elongated hollow member and configured to connect to a vacuum source to pull air from the airflow channel through the hose connection.

In one embodiment, the airflow management system further comprises a riving knife configured to extend circumferentially around a portion of the saw blade. The elongated hollow member is fixedly attached to the riving knife.

In another embodiment, the airflow management system further includes an upper guard including first and second side pawls attached to the riving knife and configured to pivot about an axis that is generally normal to the saw blade plane. The first and second pawls are positioned on opposite sides of the saw blade plane and the elongated hollow member.

In a further embodiment of the airflow management system, at least one of the dust cap, the elongated hollow member, the first side pawl, and the second side pawl includes at least one rib configured to direct airflow toward the hose connection.

In some embodiments, the dust cap defines a first plurality of windows, and the elongated hollow member defines a second plurality of windows aligned with the first plurality of windows.

In yet another embodiment of the airflow management system, at least one of the elongated hollow member and the dust cap includes a light configured to illuminate an area adjacent to the saw blade. In one embodiment, the light is configured to emit a laser line along the saw blade plane.

In a further embodiment, the elongated hollow member includes at least one hook configured to attach to the dust cap.

In one embodiment, a locking lever configured to lock the dust cap to the elongated hollow member.

In another embodiment of the airflow management system, the dust cap and the elongated hollow member are integrally formed of a single piece of material.

In one embodiment according to the disclosure, a table saw comprises a table top surface, a vacuum source, a dust cap, and an elongated hollow member. The table top surface defines an elongated blade opening in which a saw blade is configured to be positioned, and the blade opening defines a saw blade plane orthogonal to the table top surface and extending centrally along the blade opening along a length of the blade opening. The elongated hollow member includes a first prong and a second prong, the first and second prongs being configured to be positioned adjacent the saw blade on opposite sides of the saw blade plane. The first and second prongs define an opening and a partially enclosed space, in which an airflow channel is defined, therebetween. The dust cap is attached to the elongated hollow member and includes a hose connection fluidly connected to the airflow channel of the elongated hollow member and configured to connect to the vacuum source to pull air from the airflow channel through the hose connection to the vacuum source.

In some embodiments, the table saw further comprises a riving knife configured to extend circumferentially around a portion of the saw blade. The elongated hollow member is fixedly attached to the riving knife.

In another embodiment, the table saw further comprises an upper guard including first and second side pawls attached to the riving knife and configured to pivot about an axis that is generally normal to the saw blade plane. The first and second pawls are positioned on opposite sides of the saw blade plane and the elongated hollow member.

In yet another embodiment of the table saw, at least one of the dust cap, the elongated hollow member, the first side pawl, and the second side pawl includes at least one rib configured to direct airflow toward the hose connection.

In one embodiment, the dust cap defines a first plurality of windows, and the elongated hollow member defines a second plurality of windows aligned with the first plurality of windows.

In a further embodiment of the table saw, at least one of the elongated hollow member and the dust cap includes a light configured to illuminate an area adjacent to the saw blade. In some embodiments, the light is configured to emit a laser line along the saw blade plane.

In another embodiment, the elongated hollow member includes at least one hook configured to attach to the dust cap.

In yet another embodiment, the table saw includes a locking lever configured to lock the dust cap to the elongated hollow member.

In another embodiment according to the disclosure, an airflow management system for a table saw comprises an elongated member including a hollow first prong and a hollow second prong. The first and second prongs are configured to be positioned on opposite sides of a saw blade plane in which a saw blade is positioned and define an opening therebetween. The first prong includes a first window in a side of the first prong configured to face the saw blade and the second prong including a second window in a side of the second prong configured to face the saw blade. The elongated member includes a hose connection configured to connect to a dust hose, the hose connection being fluidly connected to the first and second windows through an interior of the first and second prongs to receive airflow from the first and second windows.

BRIEF DESCRIPTION OF THE DRAWINGS

FIG. 7 is a front cross-sectional view of the tuning fork and dust cap of the table saw of FIG. 2.

FIG. 8 is a side view of the upper guard system of the table saw of FIG. 2.

FIG. 14 is a side view of the upper guard system of FIG. 13.

FIG. 15 is a front perspective view of a dust cap having an illumination system.

FIG. 16 is a front perspective view of a tuning fork having an illumination system.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
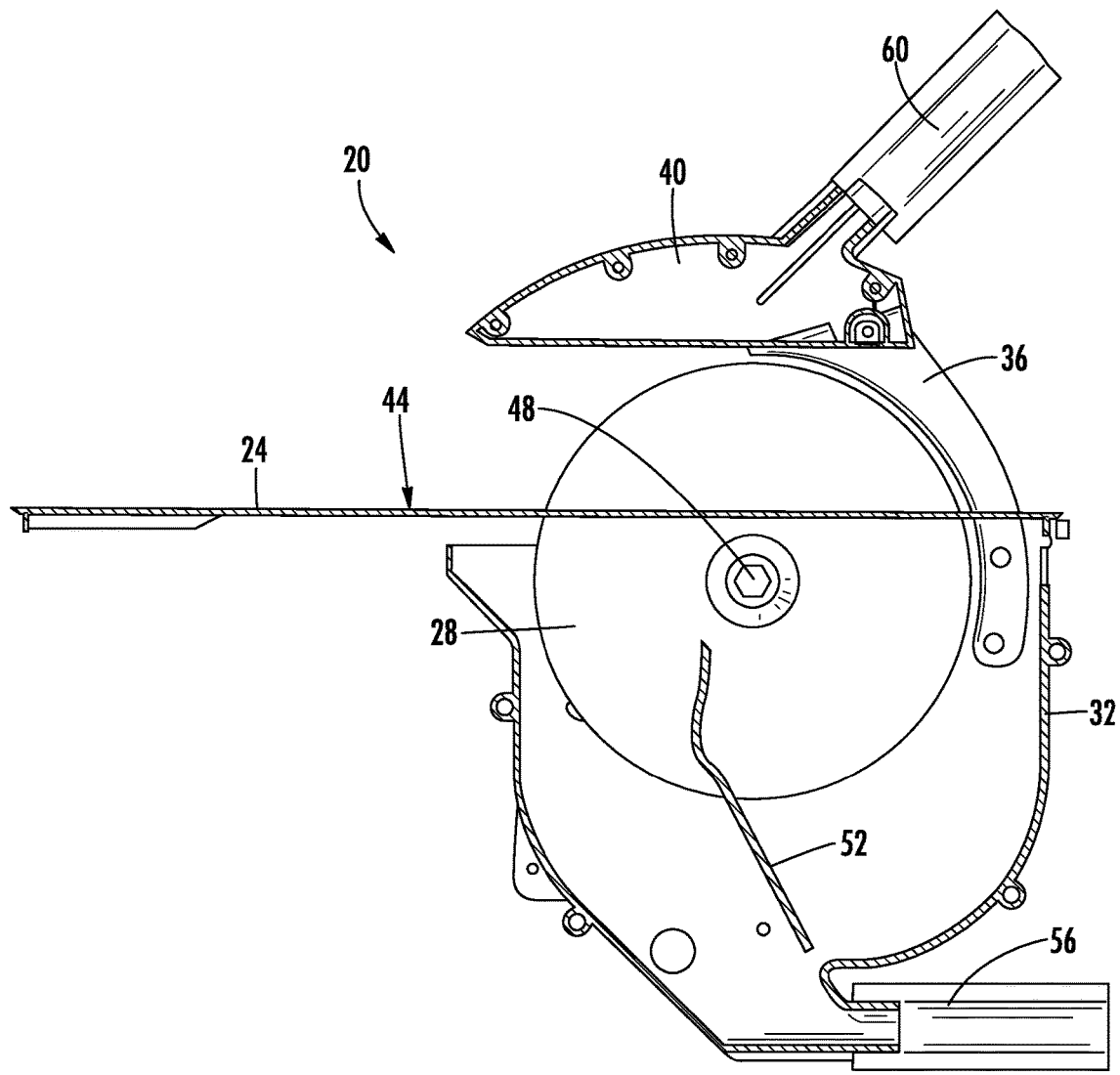
FIG. 1 is a side view of a prior art table saw.

FIG. 1 illustrates a side view of a conventional table saw 20. The table saw 20 includes a table 24, a saw blade 28, a lower guard 32, a riving knife 36, and an upper guard 40. The table 24 has an upper table top surface 44 configured to support a workpiece during cutting operations.

The saw blade 28 is driven by a motor and drivetrain unit (not shown), which is located below the table 44. The motor and drivetrain rotates an output shaft (not shown), to which the saw blade 28 is clamped by a blade washer 48 to rotate the saw blade during cutting operations.

The lower guard 32 of the table saw 20 includes a dust rip 52 and a lower dust chute 56. The dust rip 52 may be configured to guide particulates from the saw blade 28 towards the lower dust chute 56, which may be connected to a dust storage area (not shown) to store the dust and particulates for subsequent disposal. In the embodiment of FIG. 1, a single dust rip 52 is shown, though in other embodiments multiple dust rips 52 are installed on the lower guard 32. The upper guard 40 is positioned above the saw blade 28 and may be mounted to the riving knife 36. The upper guard 40 includes an upper dust chute 60 which collects dust and debris caught by the upper guard 40 and may direct the dust and debris to a storage area for subsequent disposal.

Figure 2:
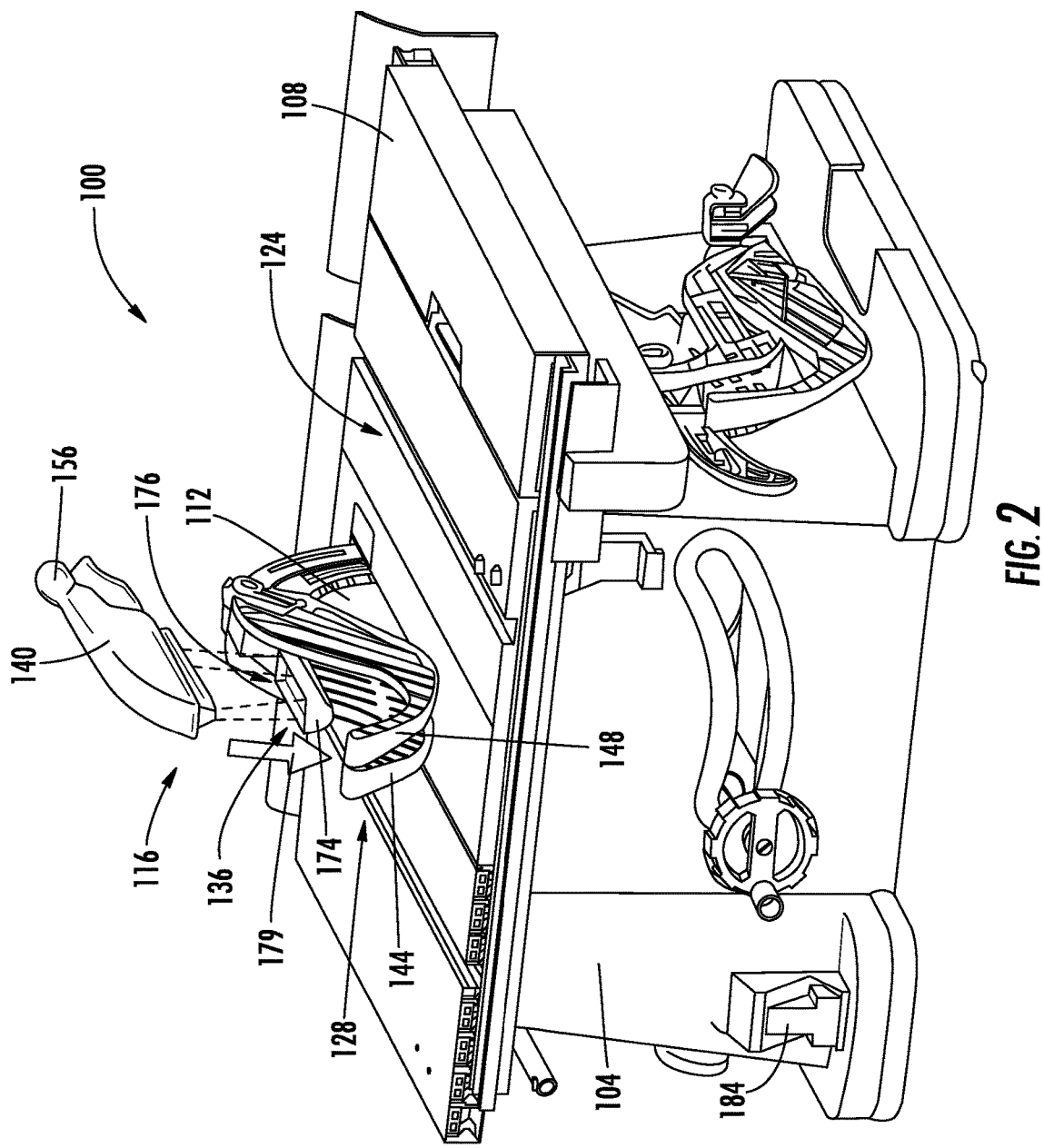
FIG. 2 is a perspective view of a table saw having an upper guard system with a hollow tuning fork and a hollow dust cap.
Figure 3:
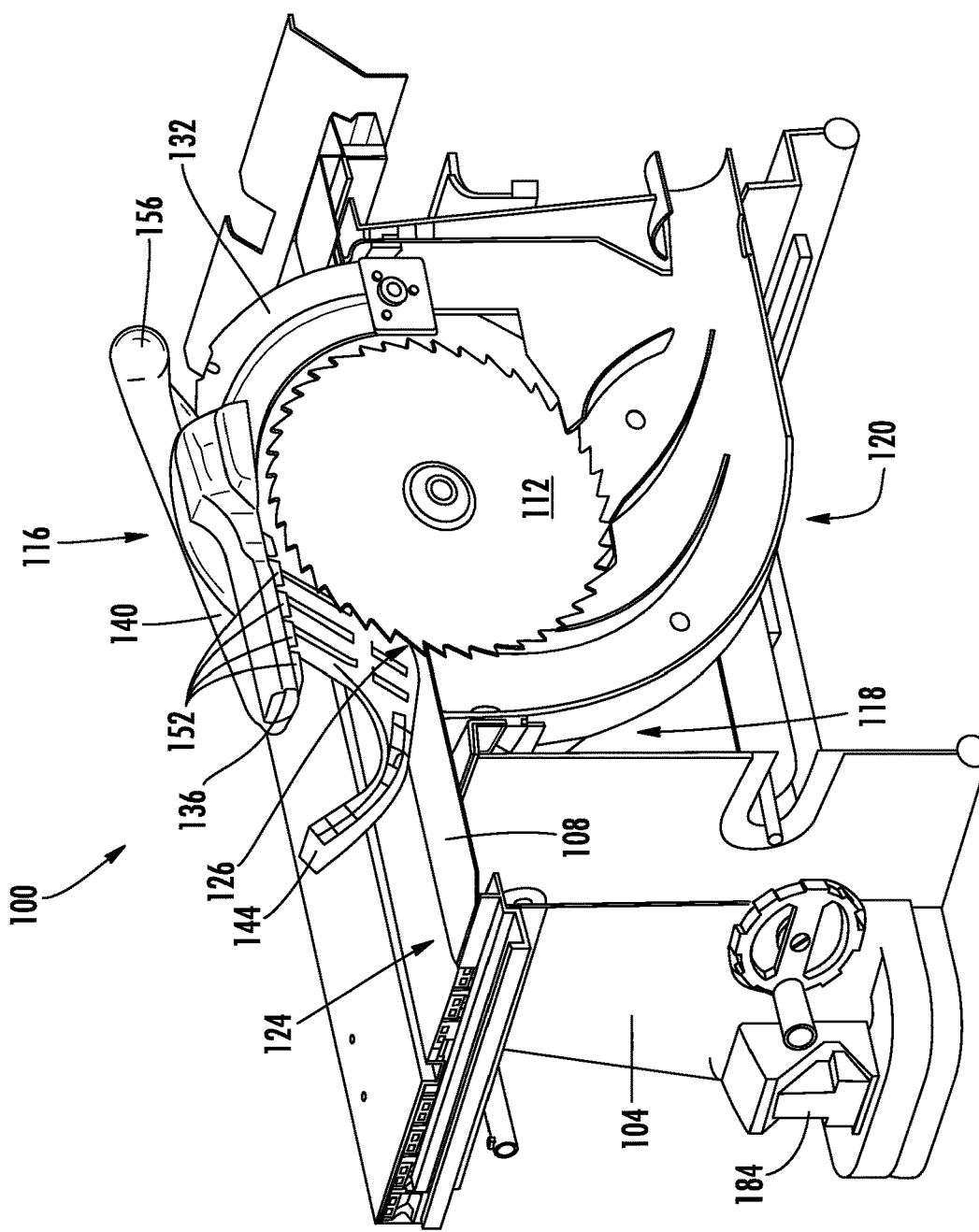
FIG. 3 is a cutaway perspective view of the table saw of FIG. 2.

FIG. 2 illustrates a table saw 100 according to the present disclosure. The table saw 100 includes a base 104, a table 108, a generally planar saw blade 112, and an airflow management and upper guard system 116. The base 104 is configured to support the table 108 and to house the internal components of the table saw 100, including the motor and drive system 118 and a lower guard 120 (FIG. 3).

The table 108 includes an upper table top surface 124 configured to support a workpiece during cutting operations. An elongated rectangular saw blade opening 126 is defined in the table top surface 124 and configured such that the saw blade 112 extends through the saw blade opening 126.

The airflow management and upper guard system 116 includes an upper guard 128, a riving knife 132, an elongated hollow member 136, also referred to herein as a tuning fork, and a dust cap 140. The upper guard 128 has two side pawls 144, 148 (FIG. 2) positioned on opposite sides of the saw blade 112. The side pawls 144, 148 are pivotable about an axis parallel to the central axis of the saw blade 112 to enable a workpiece to be inserted under the side pawls 144, 148. The riving knife 132 is positioned behind the saw blade 112 to split the workpiece after it has been cut so that the saw blade 112 does not catch on the workpiece and eject a portion of the workpiece toward a user of the table saw 100.

Figure 6:
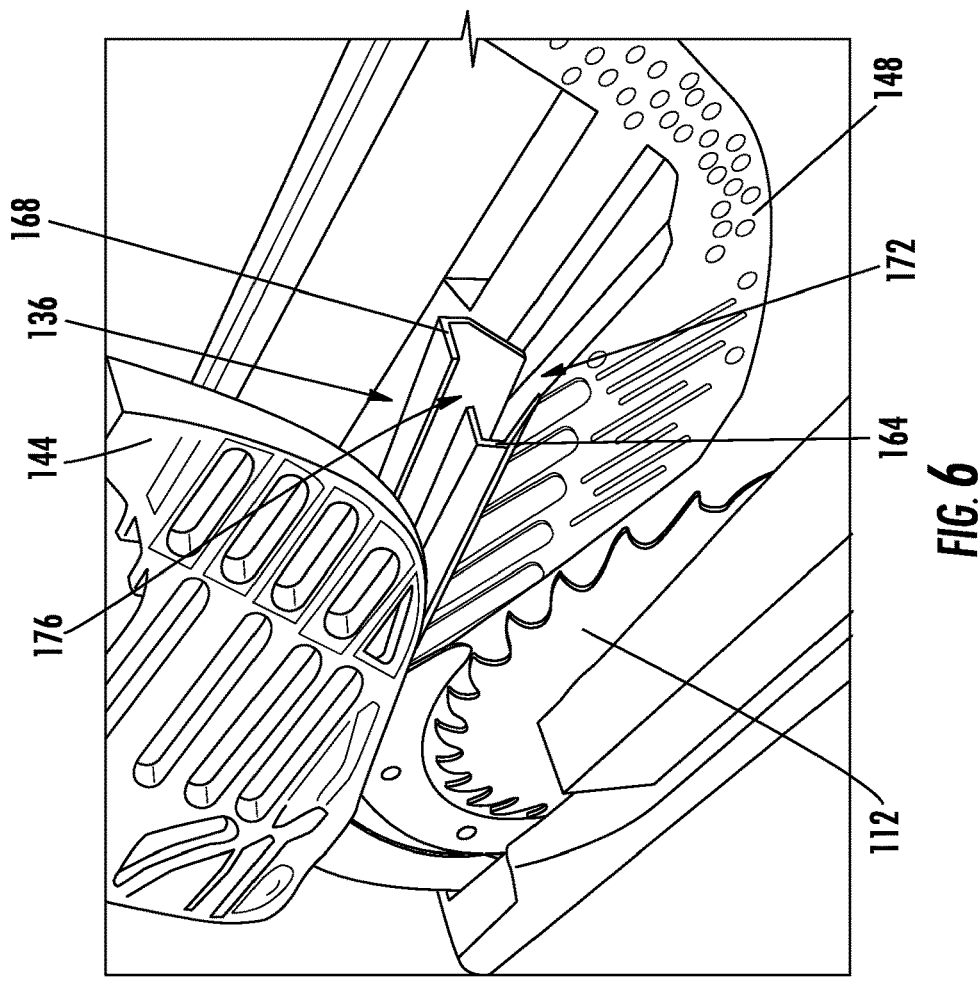
FIG. 6 is a side perspective view of the tuning fork of the table saw of FIG. 2.
Figure 5:
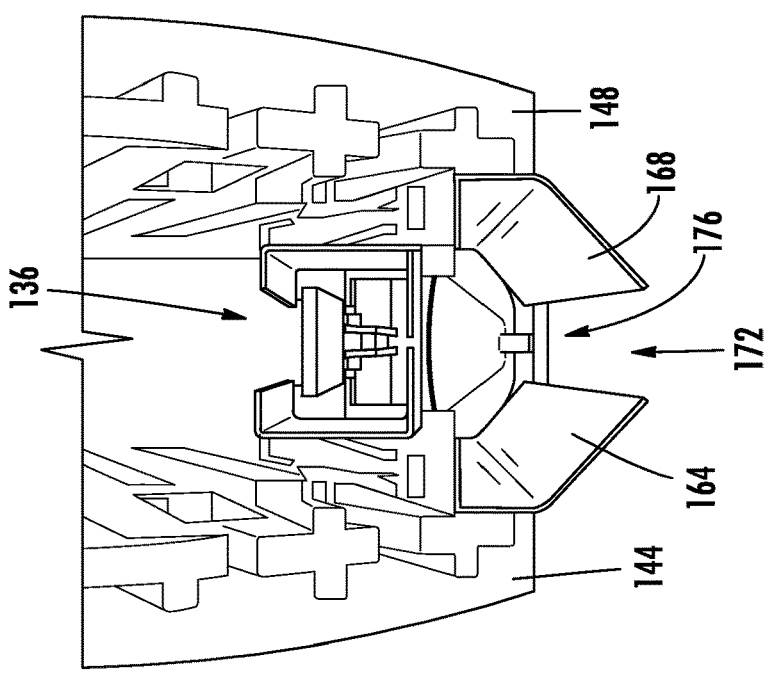
FIG. 5 is a front view of the tuning fork of the table saw of FIG. 2

The tuning fork 136 may be mounted above the saw blade 112 on the riving knife 132, between the side pawls 144, 148 of the upper guard 128. As shown in the detail views of FIGS. 5-7, the tuning fork 136 includes a first prong 164 and a second prong 168 defining an opening 172 therebetween. In some embodiments, the tuning fork 136 may include an end cap 174 (FIG. 3) closing off a front end of the tuning fork 136, though other embodiments (for example FIGS. 5 and 6) may not include an end cap. The tuning fork 136 may be hollow to define an airflow channel 176 through the center of the tuning fork 136, between the prongs 164, 168 to enable flow of air through the tuning fork 136 to the dust cap 140. As best seen in FIG. 7, the tuning fork 136 may incorporate hooks 178, to which the dust cap 140 is attached.

The dust cap 140 fits inside the tuning fork 136, and may be connected to the tuning fork 136 by a snap fit connection, screws, and/or clips such as the hooks 178 shown in FIG. 7, while in other embodiments the dust cap 140 and the tuning fork 136 may be integrally formed as a single piece. In some embodiments, the dust cap 140 may be moved downwardly to snap into connection with the tuning fork 136, in direction of arrow 179 (FIG. 2), while in other embodiments the dust cap 140 may slide horizontally into clips of the tuning fork 136 to connect to the tuning fork 136.

Figure 4:
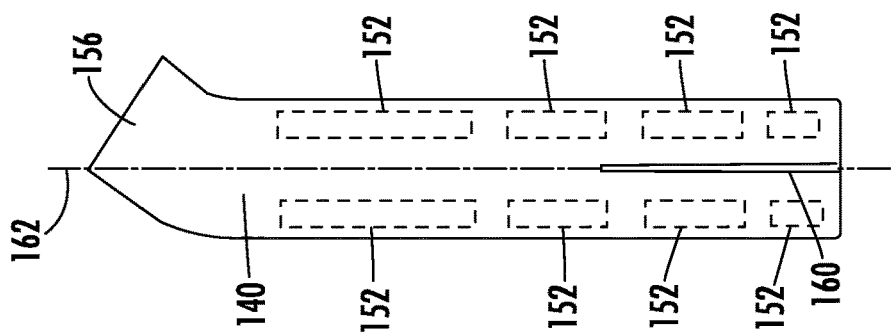
FIG. 4 is a top view of the dust cap of the table saw of FIG. 2.

As shown in FIGS. 4 and 8, the dust cap 140 defines a plurality of windows 152, which are aligned with corresponding windows 154 defined in the tuning fork 136. The dust cap 140 further includes a dust hose connection 156 at an end behind the saw blade 112 to facilitate connection of the dust cap 140 to a vacuum hose 180 (FIG. 8). The dust cap 140 may be hollow so that air, dust, and particulates flow from the flow channel 176 of the tuning fork 136, through the dust cap 140, and into the vacuum hose 180 via the dust hose connection 156. In some embodiments, the dust cap 140 has an indicator line 160 on a length of a top surface of the dust cap 140. The indicator line 160 is aligned with the saw blade plane 162 (FIG. 4) in which the saw blade 112 is positioned to provide a visual indication of the cutting line of the saw blade 112 beneath the dust cap 140 and upper guard 128.

In some embodiments, the dust cap 140 may include airflow ribs 162 (FIG. 8) configured to guide airflow toward the rear portion of the dust cap and to the hose connection 156. In further embodiments, the tuning fork 136 may also include airflow ribs (not shown) to guide the airflow within the tuning fork 136.

In operation, the table saw 100 is activated by a user pressing a button or activating a switch 184. The motor of the saw 100 spins the saw blade 112, and a user pushes a workpiece across the table top surface 124 into the lower portion of the upper guard 128, urging the pawls 144, 148 to pivot upwardly and out of the way of the workpiece. As the workpiece contacts the saw blade 112, the workpiece is cut and dust and particulates scatter within the upper guard 128. As shown in FIG. 8, the spinning saw blade 112 ejects dust and particulates are upwardly toward the tuning fork 136 and dust cap 140. A vacuum hose 180 is connected to the dust hose connection 156 at one end and to a vacuum source 188 (FIG. 8) at another end, such that the vacuum source 188 pulls air from the area above the saw blade 112 through the tuning fork 136 and the dust cap 140. Dust and particulates jettisoned by the saw blade are urged upwardly through the opening 172 (FIG. 7) of the tuning fork 136 and into the dust cap 140. The dust and particulates then travel within the dust cap 140, through the hose connection 156 and into the dust hose 180 to the vacuum source 188.

Figure 9:
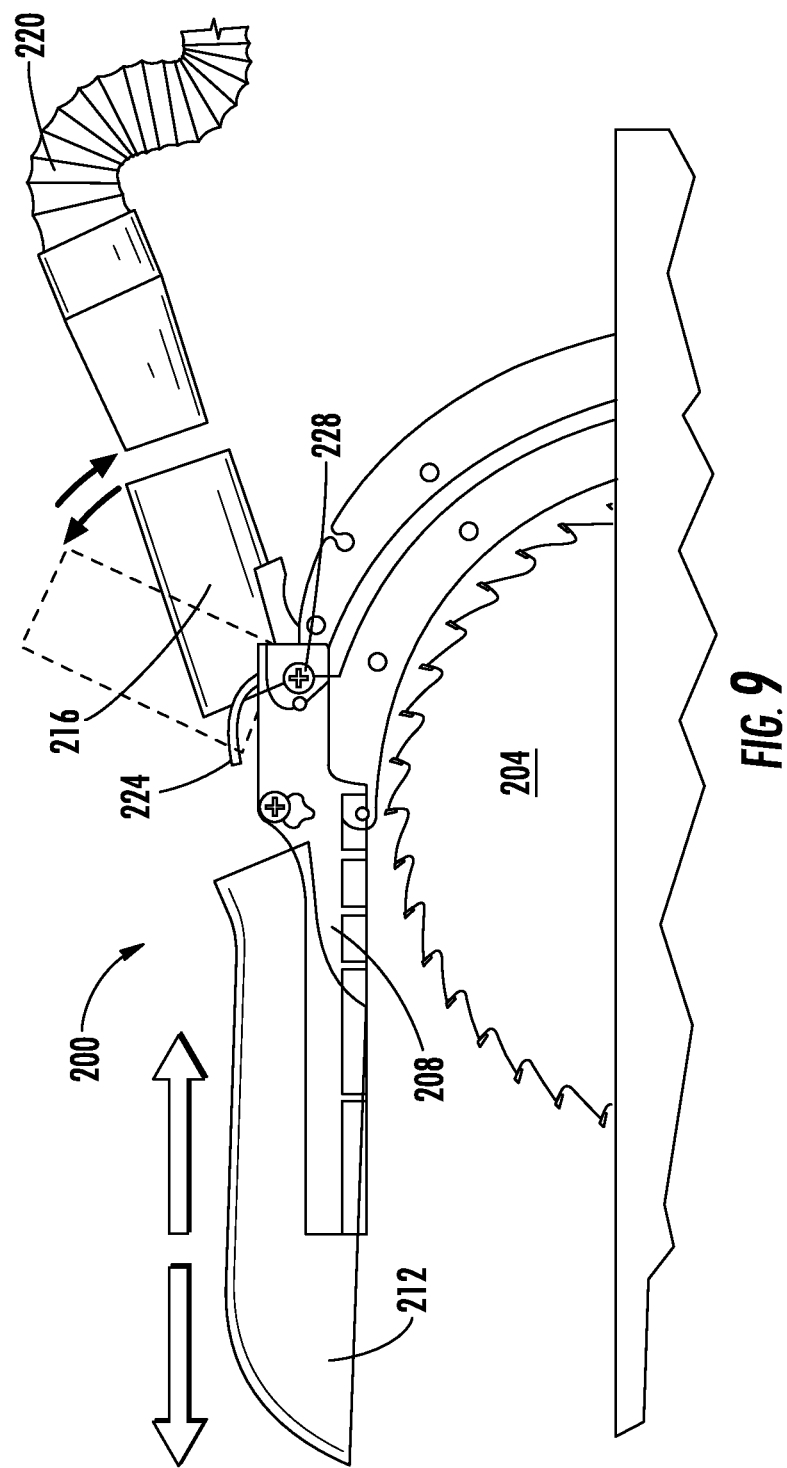
FIG. 9 is a side view of another upper guard system for a table saw.

FIG. 9 depicts another airflow management and upper guard system 200, which can be used in the table saw 100 in place of the airflow management and upper guard system 116 described above. The upper guard system 200 is mounted above a saw blade 204, and includes a tuning fork 208, a dust cap 212, and a hose connection 216. The tuning fork 208 is substantially similar to the tuning fork 136 described above.

The dust cap 212 is configured to slide over the tuning fork 208 and connect to the hose connection 216. The hose connection 216 is connected at one end to the dust cap 212, and at the other end to a vacuum hose 220. The hose connection further includes a locking lever 224, which engages the dust cap 212 to lock the dust cap 212 in place. The locking lever 224 is pivotable about a pivot point 228.

The dust cap 212 is configured to slide into position over the tuning fork 208 prior to a cutting operation, to the right in the view of FIG. 9. The dust cap 212 engages the locking lever 224 of the hose connection 216 once the dust cap 212 is in position, and the locking lever 224 locks the dust cap 212 to the hose connection 216. The vacuum hose 220 is then connected to the opposite end of the hose connection 216, and the cutting operation can commence.

Similarly to the embodiment described above, during a cutting operation a vacuum sucks air, dust, and particulates from the saw blade 204 through the tuning fork 208 and dust cap 212 and into the vacuum hose 220.

When the table saw is not being used for a cutting operation, the airflow management and upper guard system 200 can be disassembled for cleaning or other maintenance. The vacuum hose 220 is disconnected from the hose connection 216, which may then be pivoted counter-clockwise about the pivot point 228. Pivoting the hose connection 216 disengages the locking lever 224 from the dust cap 212. The dust cap 212 slides to the left in the view of FIG. 9 to be removed from the table saw for cleaning. In some embodiments, the locking lever 224 is further configured to lock the upper guard (not shown in FIG. 9) in place. In such an embodiment, pivoting the hose connection 216 also releases the upper guard for cleaning.

Figure 10:
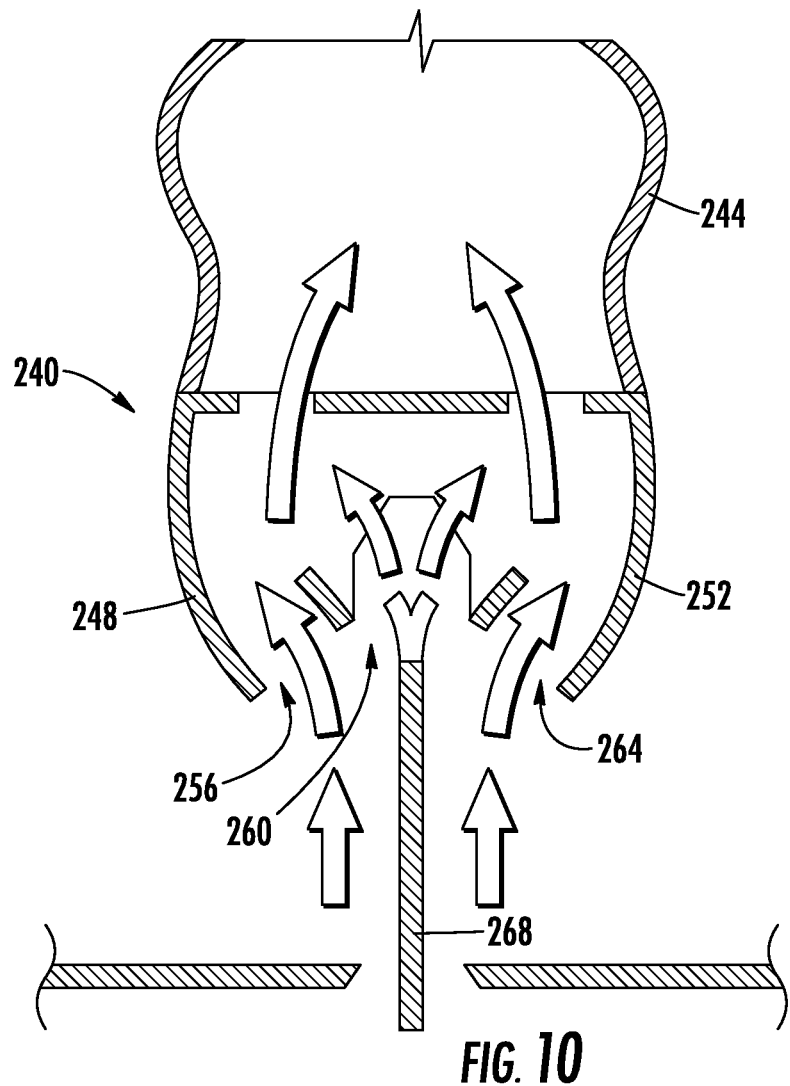
FIG. 10 is a front cross-sectional view of another tuning fork and dust cap for a table saw upper guard system.

Another embodiment of a tuning fork 240 and a dust cap 244 is illustrated in FIG. 10. The dust cap 244 is configured to attach to the top of the tuning fork 240. The tuning fork 240 has a first prong 248 and a second prong 252. Three openings 256, 260, 264 are defined between the first and second prongs 248, 252. As a saw blade 268 spins, airflow generated by the spinning blade 268 flows through the three openings 256, 260, 264, through the tuning fork, and into the dust cap 244. The airflow urges dust and particulates into the dust cap 244, where the dust and particulates are captured by a vacuum in a manner similar to operation of the dust caps discussed above. In some embodiments, the tuning fork 240 and the dust cap 244 may be integral within the upper guard system.

Figure 11:
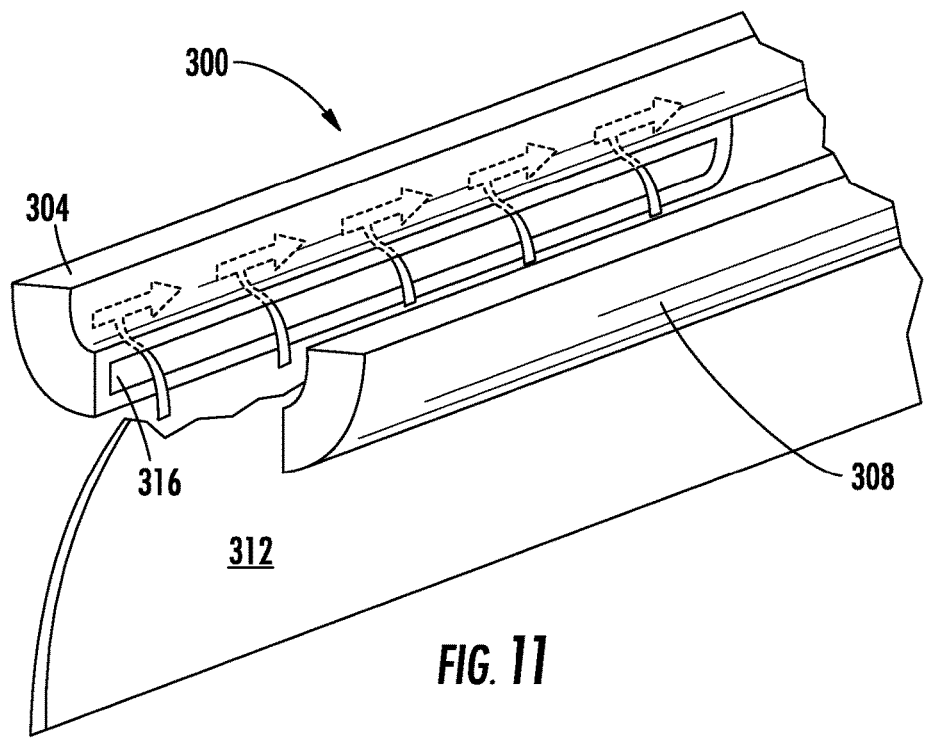
FIG. 11 is a side perspective view of a hollow tuning fork for a table saw.
Figure 12:
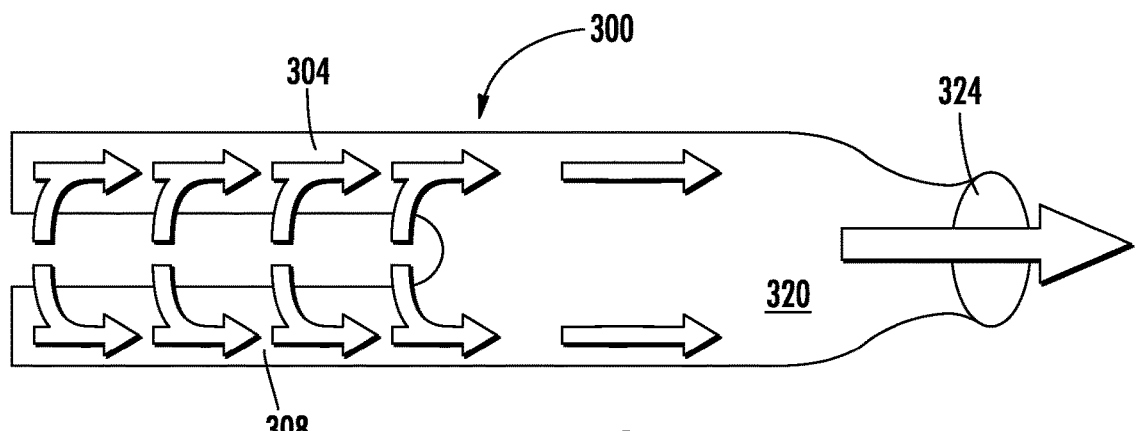
FIG. 12 is a top cross-sectional view of the hollow tuning fork of FIG. 11.

Another embodiment of a tuning fork 300 is illustrated in FIGS. 11 and 12. The tuning fork 300 has a first prong 304 and a second prong 308, positioned above and on either side of a saw blade 312. The first and second prongs 304, 308 each include a passage or window (only the passage 316 of the first prong 304 is visible in FIG. 11). The tuning fork 300, including the prongs 304, 308, is hollow, defining an inner chamber 320. At an end of the tuning fork 300 opposite the prongs 304, 308, the tuning fork 300 may include a hose connection 324 configured to connect to a vacuum hose (not shown).

As the saw blade 312 spins, airflow generated by the spinning saw blade 312 combined with suction of a vacuum (not shown) pulling air through the hose connection 324 and chamber 320 pulls dust and particulates through the passages 316. The dust and particulates are urged through the chamber 320 and the hose connection 324 and into a vacuum hose (not shown) attached to the hose connection 324. The tuning fork 300 of FIGS. 11 and 12 therefore performs the functions of both the tuning forks and the dust caps of the embodiments described above.

Figure 13:
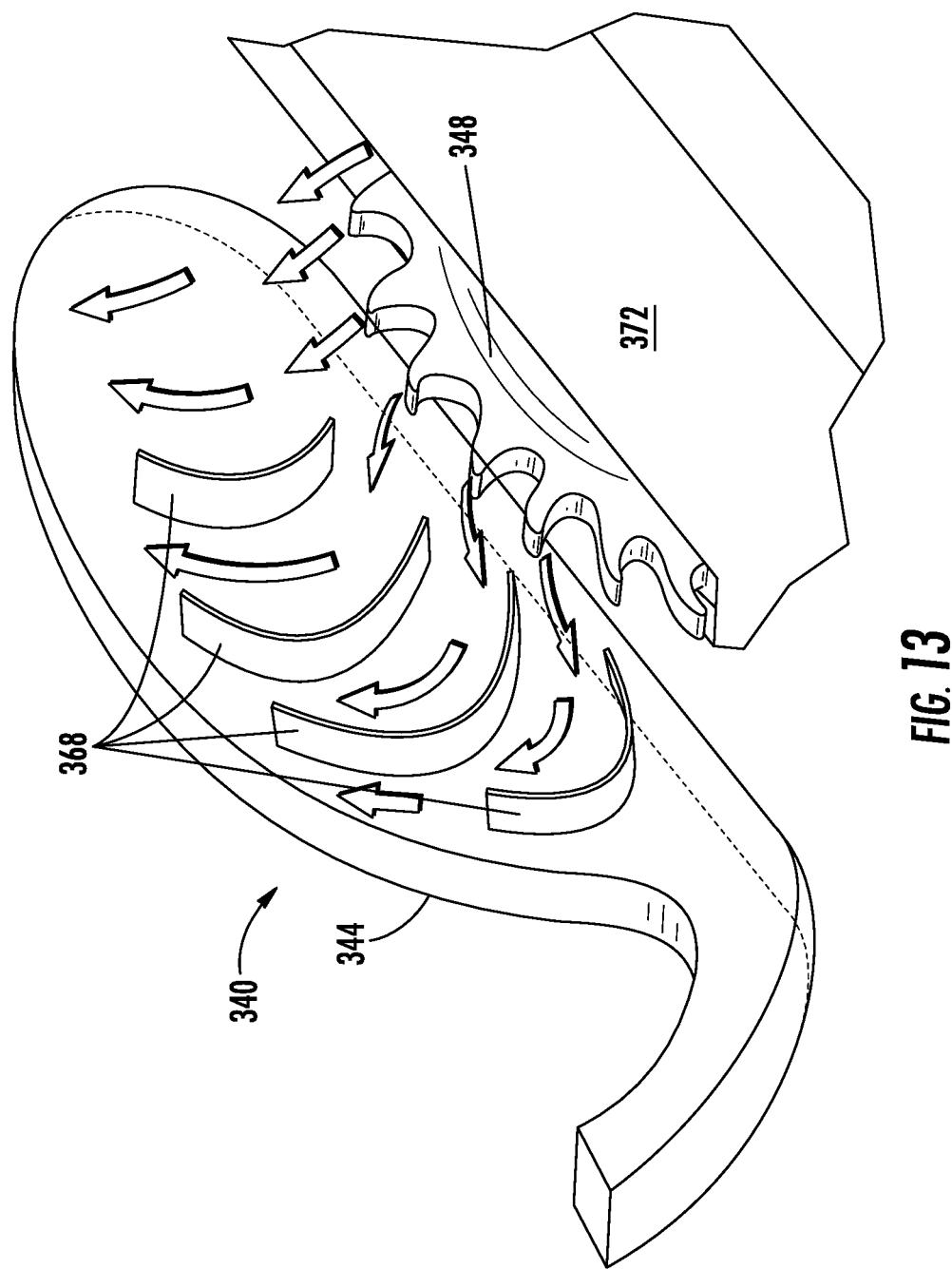
FIG. 13 is a side perspective view of an upper guard system for a table saw having side pawls with integrated airflow ribs.

FIGS. 13 and 14 illustrate another embodiment of an airflow management and upper guard system 340 having side pawls 344 (only one is illustrated in FIGS. 13 and 14), which can be used in the table saw 100 of FIG. 2 in place of side pawls 144, 148. The airflow management and upper guard system 340 also includes a tuning fork 352, a dust cap 356, a hose connection 358, and a riving knife 360, all of which are similar to those described above. In one embodiment, the tuning fork 352, dust cap 356, and hose connection 358 may each be separate parts connected to one another. In another embodiment, the tuning fork 352 and the dust cap 356 may be integrally formed as a single part. In yet another embodiment, the tuning fork 352, the dust cap 356, and the hose connection 358 may all be integrally formed as a single part by, for example, plastic injection molding.

The side pawls 344 are positioned with one on each side of a saw blade 348 and are affixed to the riving knife 360 at a pivot connection 364. The side pawls 344 are configured to pivot about the pivot connection 364 to enable a workpiece to slide underneath the side pawls 344. Each side pawl 344 has a plurality of curved airflow ribs 368 positioned inside the side pawl 344.

During operation of the saw, the saw blade 348 generates airflow in a direction generally tangential to the outer circumference of the saw blade 348. The airflow, including dust and debris particles, flows upwardly into the pawls 344. The airflow ribs 368 in the side pawls 344 redirect the airflow backward, toward the rear of the side pawls 344, tuning fork 352, and dust cap 356. The dust and particles are collected in the tuning fork 352 and dust cap 356 and pulled by the vacuum suction into a collection area.

FIG. 15 illustrates another dust cap 400 according to the present disclosure. The dust cap 400 is substantially the same as the dust cap 136 described above with regard to FIGS. 2-4 and is mounted atop a tuning fork 402. The dust cap 400 includes an illumination system 404 at a front end of the dust cap 400. The illumination system 404 may include a power switch 408, a laser diode 412, and a LED light 416. The laser diode 412 is configured to project a laser line downwardly, partially through the tuning fork 402, to illuminate a line 422 on a workpiece 424 and table top 426 indicating the location of the cutting line. The LED light 416 is configured to project light downwardly through the tuning fork 402 to illuminate an area 428 of the workpiece 424 and table top 426 to enable a user to better see the cutting area.

The power switch 408 is triggered to activate the LED light 416 and laser diode 412. In some embodiments, the power switch 408 has multiple modes, to activate only one of the LED light 416 and the laser diode 412, or to alter the intensity of the light provided by the LED light 416. In some embodiments, the laser diode 412 and the LED light 416 are powered by a battery located proximate to the illumination system, while in other embodiments the laser diode 412 and the LED light 416 are connected by a wire to the power supply for the table saw to which the dust cap 400 is attached.

The dust cap 400 of FIG. 15 operates to pull dust and debris from the work area in a manner similar to that of the dust cap 140 of FIGS. 2, 3, and 8, while also providing light for the work area and displaying a cutting line on the workpiece to enable improved cutting accuracy.

FIG. 16 illustrates another embodiment of a hollow tuning fork 440. The tuning fork 440 is substantially the same as the tuning fork 212 described above with regard to FIGS. 10 and 11. The tuning fork 540 includes a first prong 444, a second prong 448, an illumination system 452 at a front end of the tuning fork 440, and a cover 456 over the front portion of the tuning fork 440. The illumination system 452 has two LED lights 460, one on each of the first and second prongs 444, 448. The LED lights 460 are configured to project light downwardly to illuminate an area 464 of a workpiece 468 and table top 470 to enable a user to better see the cutting area. In some embodiments, the illumination system 452 includes a power switch located on the cover 456 or any other desired location, while in other embodiments the illumination system 452 is activated automatically when the saw is activated.

The cover 456 is attached to a top surface of the tuning fork 440 and has a projection 472 extending from the center of the cover 456. The cover 456 and projection 472 have a central marking 476 to enable the user to visualize the cutting line of the table saw to which the tuning fork 440 is attached. In some embodiments, the tuning fork 440 may include a laser diode (not shown) on a lower portion of the projection 472. The laser diode is configured to project a laser line 480 onto the workpiece 468 and table top 470 to further aid the user in visualizing the cutting line.

The tuning fork 440 of FIG. 16 operates to pull dust and debris from the work area in a manner similar to that of the tuning fork 212 of FIGS. 10 and 11, while also providing light for the work area and, in some embodiments, displaying a cutting line on the workpiece to enable improved cutting accuracy.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

The invention claimed is:

1. An airflow management system for a table saw comprising:
   an elongated hollow member including a first prong and a second prong, each of which has an upper end and a lower end, the first and second prongs being configured to be positioned adjacent a saw blade on opposite sides of a saw blade plane in which the saw blade is positioned, and the first and second prongs defining (i) an opening extending from the lower end of the first prong to the lower end of the second prong in such a way that the saw blade plane passes through the opening, and (ii) a partially enclosed space between the first and second prongs, the partially enclosed space including a first end at the opening and a second end at the upper ends of the first and second prongs, wherein an airflow channel is defined in the partially enclosed space from the opening at the first end of the partially enclosed space to the second end of the partially enclosed space; and
   a dust cap attached to the elongated hollow member and including a hose connection fluidly connected to the airflow channel of the elongated hollow member and configured to connect to a vacuum source to pull air from the airflow channel through the hose connection, the dust cap defining a dust cap volume extending from the second end of the partially enclosed space to the hose connection and configured such that air flows from the opening through the partially enclosed space, then the dust cap volume, and into the hose connection.

2. The airflow management system of claim 1, further comprising:
a riving knife configured to extend circumferentially around a portion of the saw blade,
wherein the elongated hollow member is fixedly attached to the riving knife.

3. The airflow management system of claim 2, further comprising:
an upper guard including first and second side pawls attached to the riving knife and configured to pivot about an axis that is generally normal to the saw blade plane, the first and second pawls being positioned on opposite sides of the saw blade plane and the elongated hollow member.

4. The airflow management system of claim 3, wherein at least one of the dust cap, the elongated hollow member, the first side pawl, and the second side pawl includes at least one rib configured to direct airflow toward the hose connection.

5. The airflow management system of claim 1, wherein:
at least one of the elongated hollow member and the dust cap includes a light configured to illuminate an area adjacent to the saw blade, and
the light is configured to emit a laser line along the saw blade plane.

6. The airflow management system of claim 1, wherein the elongated hollow member includes at least one hook configured to attach the elongated hollow member to the dust cap.

7. The airflow management system of claim 1, further comprising:
a locking lever configured to lock the dust cap to the elongated hollow member.

8. The airflow management system of claim 1, wherein the dust cap and the elongated hollow member are integrally formed of a single piece of material.

9. An airflow management system for a table saw comprising:
an elongated hollow member including a first prong and a second prong, each of which has an upper end and a lower end, the first and second prongs being configured to be positioned adjacent a saw blade on opposite sides of a saw blade plane in which the saw blade is positioned, and the first and second prongs defining (i) an opening extending from the lower end of the first prong to the lower end of the second prong in such a way that the saw blade plane passes through the opening, and (ii) a partially enclosed space between the first and second prongs, the partially enclosed space including a first end at the opening and a second end at the upper ends of the first and second prongs, wherein an airflow channel is defined in the partially enclosed space from the opening at the first end of the partially enclosed space to the second end of the partially enclosed space; and
a dust cap attached to the elongated hollow member and including a hose connection fluidly connected to the airflow channel of the elongated hollow member and configured to connect to a vacuum source to pull air from the airflow channel through the hose connection, wherein:
the dust cap defines a first plurality of windows, and
the elongated hollow member defines a second plurality of windows aligned with the first plurality of windows, the dust cap and elongated hollow member configured such that a further airflow passes through the first and second plurality of windows into the partially enclosed space.

10. A table saw comprising:
a table top surface defining an elongated blade opening in which a saw blade is configured to be positioned, the blade opening defining a saw blade plane orthogonal to the table top surface and extending centrally along the blade opening along a length of the blade opening;
a vacuum source;
an elongated hollow member including a first prong and a second prong, each of which has an upper end and a lower end, the first and second prongs being configured to be positioned adjacent the saw blade on opposite sides of the saw blade plane, and the first and second prongs defining (i) an opening extending from the lower end of the first prong to the lower end of the second prong in such a way that the saw blade plane passes through the opening, and (ii) a partially enclosed space between the first and second prongs, the partially enclosed space including a first end at the opening and a second end at the upper ends of the first and second prongs, wherein an airflow channel is defined in the partially enclosed space from the opening at the first end of the partially enclosed space to the second end of the partially enclosed space; and
a dust cap attached to the elongated hollow member and including a hose connection fluidly connected to the airflow channel of the elongated hollow member and configured to connect to the vacuum source to pull air from the airflow channel through the hose connection to the vacuum source, the dust cap defining a dust cap volume extending from the second end of the partially enclosed space to the hose connection and configured such that air flows from the opening through the partially enclosed space, then the dust cap volume, and into the hose connection.

11. The table saw of claim 10, further comprising:
a riving knife configured to extend circumferentially around a portion of the saw blade,
wherein the elongated hollow member is fixedly attached to the riving knife.

12. The table saw of claim 11, further comprising:
an upper guard including first and second side pawls attached to the riving knife and configured to pivot about an axis that is generally normal to the saw blade plane, the first and second pawls being positioned on opposite sides of the saw blade plane and the elongated hollow member.

13. The table saw of claim 12, wherein at least one of the dust cap, the elongated hollow member, the first side pawl, and the second side pawl includes at least one rib configured to direct airflow toward the hose connection.

14. The table saw of claim 10, wherein:
the dust cap defines a first plurality of windows, and
the elongated hollow member defines a second plurality of windows aligned with the first plurality of windows, the dust cap and elongated hollow member configured such that a further airflow passes through the first and second plurality of windows into the partially enclosed space.

15. The table saw of claim 10, wherein:
at least one of the elongated hollow member and the dust cap includes a light configured to illuminate an area adjacent to the saw blade, and
the light is configured to emit a laser line along the saw blade plane.

16. The table saw of claim 10, wherein the elongated hollow member includes at least one hook configured to attach the elongated hollow member to the dust cap.

17. The table saw of claim 10, further comprising:
a locking lever configured to lock the dust cap to the elongated hollow member.

* * * * *